Aug. 10, 1937. W. R. WILEY 2,089,842
DUST EXCLUDING COVER FOR DRAG LINK CONSTRUCTION
Filed Oct. 26, 1935
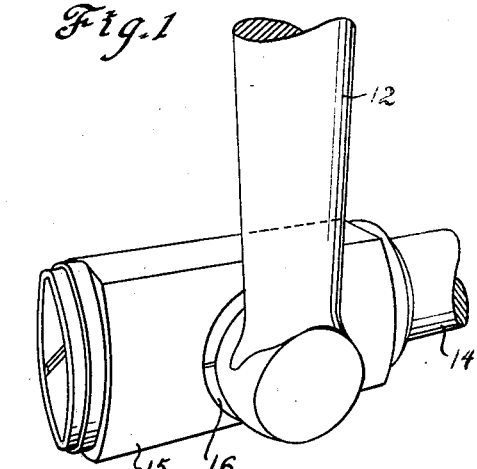
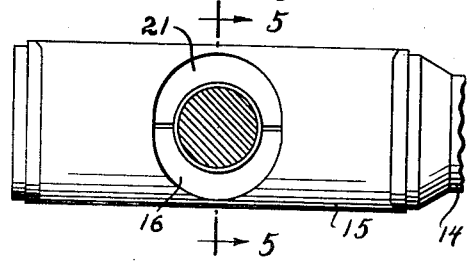
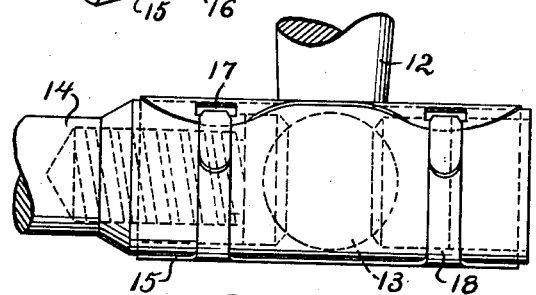
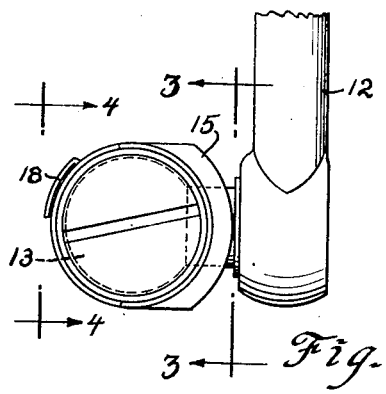
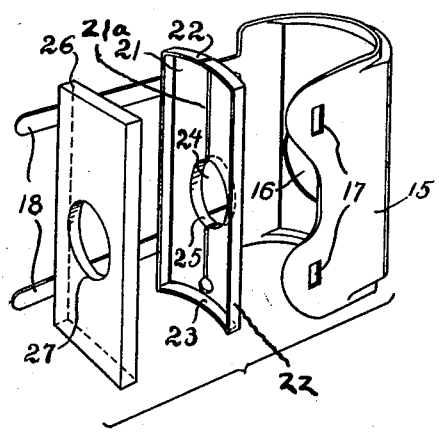
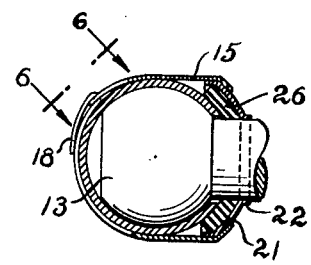
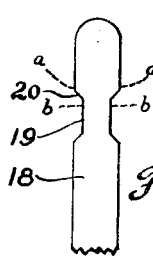
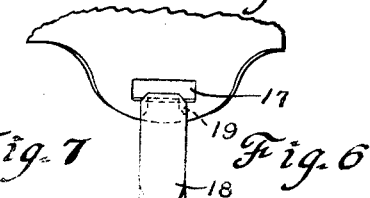
INVENTOR.
William R. Wiley
BY Swan Frye and Hardesty
ATTORNEYS.

Patented Aug. 10, 1937

2,089,842

UNITED STATES PATENT OFFICE 2,089,842

DUST EXCLUDING COVER FOR DRAG LINK CONSTRUCTION

William R. Wiley, Detroit, Mich.

Application October 26, 1935, Serial No. 46,910

3 Claims. (Cl. 287—90)

This invention relates to drag link dust covers, and has for its object a simple and inexpensive cover appurtenance whereby the access of dust and other foreign matter to the interior of the drag link in the vicinity of a cooperating ball or knuckle joint may be prevented without interference with the freedom of action of the parts in question. The combination of parts comprised in my invention is capable of easy and quick substitution one for another and similarly facilitates temporary removal when access to the enclosed parts is desired, as for repair or adjustment work.

In the drawing:

Figure 1 is a perspective of a drag link with one of my improved covers in position thereon, and also showing in proper relation thereto a broken-away portion of a steering bell crank.

Figure 2 is an end elevational view.

Figure 3 is a side elevational view of the drag link and its applied dust cover, but with the steering ball omitted in order that the various laminations of the cover piece may be shown in proper relation to one another and to the drag link structure.

Figure 4 is a partly phantom view taken on the opposite side of the drag link from that illustrated in Figures 1 and 3, and designed to bring out particularly the function of the encircling straps in holding the cover piece in position about the drag link.

Figure 5 is a sectional elevational view taken along the line 5—5 of Figure 3 and looking in the direction of the arrows there shown.

Figure 6 is a fragmentary view of a portion of the exterior of the cover piece when in position about the drag link, taken from the position bounded by the arrows 6—6 of Figure 5 and designed to bring out in practically full scale the function of the attenuated parts of the straps in holding the cover tightly about the drag link body.

Figure 7 is a fragmentary illustration in a plan view of the attenuated portion of one of the holding straps.

Figure 8 is a perspective of the constituent parts of the dust cover drawn out or spaced from one another, so that the structure of each may be shown, while not impairing the obvious and intended interfitting character of the parts.

12 indicates an ordinary steering ball stud whose knuckled end portion 13 is designed to be positioned within and act cooperatively with a selected portion of the drag link piece 14. It is of course essential that adequate freedom of action of the ball joint relatively to the drag link be assured, and yet it is of the utmost importance that as nearly as possible a complete exclusion of dust or other foreign matter should be maintained as regards the interior of the drag link and the surface of the ball or knuckle which operates therein.

It is also important that if any other dust-excluding medium than a mere fabric pad or wrapper be resorted to, this should be so tightly positionable about the body of the drag link as not to be displaceable under use and thus contribute frictionally to the ineffective action of the steering bell crank.

To this end I provide a cover or shell 15, provided with a hole 16, of such size that the ball or knuckle 13 of the steering ball stud can easily pass therethrough when the shell 15 is first positioned about the drag link 14. This shell, as brought out particularly in Figure 8, is in its main body portion of semi-circular or semi-cylindrical contour, and one edge is provided with slots or kerfs 17 in which can engage the ends of the straps 18, which, upon being bent around the body of the drag link, and upon being passed through the slots 17, are then bent back so as to effect the tight drawing of the curved portion of the cover about the body of the drag link. In order that a maximum of tightness of fit may be had, I find it preferable to cut away or similarly attenuate each of the straps 18 at the point 19, where, upon encircling a drag link of specified diameter, the straps may be expected to be bent in order to clinch the whole of the cover about the drag link, the tapered portions 20 of these attenuations being located at the point where the otherwise maximum tightening draw of the straps about the drag link might be expected to occur. Due, however, to the sloping of the strap edges at the points 20 I have found that there is induced a wedging or additional tapering action upon the edges of the slots 17 when the otherwise maximum draw upon the straps about the drag link has taken place, which results in the final bend of the strap against the edges of its slot 17, occurring, not at a point of its maximum width, as for example, a—a in Figure 7, but rather along the line b—b, thus resulting in a tighter clinch of the straps about the drag link and of course reducing to a minimum the possibility of the cover shell 15 being displaced relatively thereto.

Seated within the concavity of the shell 15 is a sheet metal holder piece 21, provided with slightly flanged sides and ends 22 and slitted, as at 21a, through almost its entire length, though held together at one end by a bridge or uncut portion 23. Midway along this central slit in the holder piece is located a hole 24 whose surrounding edges are preferably flanged, as at 25, in order to form a definite seat for the edges of the aperture 27 in the rubber insert 26. This aperture 27 registers with the holes 16 and 24 in the metal parts 15 and 21 respectively. This hole 27 is normally of lesser diameter than the knuckle on the end of the steering bell crank, but the resiliency of the material permits its stretching to a degree to allow the bell or knuckle 13 of the ball stud to slip thereover when the parts are assembled; and the pressure of the bell crank ball 13 thereagainst when the parts are assembled slightly forces the resilient material of the pad 26 surrounding the hole 27 against the seat constituted by the flange 25 in the holding piece 21, thus additionally forming a resiliently spreading seat against which the ball 13 acts, without interference, however, with its freedom of motion within the drag link structure. This pad is, however, held so tightly against the wall of the drag link by the sheet metal jacket 15, that the pad or mat 26 is in turn forced so closely against the outer surface of the drag link, that practically no dirt can find its way into the interior thereof.

What I claim is:

1. A dust-excluding construction for drag links, comprising a semi-cylindrical shell provided with means for effecting its tight engagement about the drag link, said shell being provided with a hole through which the knuckled end of a ball stud may engage, a marginally flanged holding frame cradled within said shell and provided with a centrally located hole and a kerf in its web extending from said hole to the frame's margin, whereby the size of said hole may be temporarily increased to permit the positioning of the ball stud therethrough and a resilient pad member held in close relation against the web of said frame by the marginal engagement of said flanged frame edges and having an apertured central portion adapted to register with the central aperture in the web of said frame and with it to fit over the neck of the ball stud and adapted to be frictionally engaged by the knuckled end thereof and to be forced by it into tightly seated position within the holding frame.

2. Means for effecting the exclusion of foreign matter from the interior of a drag link without interference with the functioning of a ball stud therein, comprising, in combination with a centrally apertured holding shell provided with means for effecting its tight positioning about the corresponding portion of the drag link, a marginally flanged holding frame contained within the concaved portion of the holding shell, said frame being apertured registeringly with the holding shell and its web being provided with a kerf extending from said aperture to a margin thereof, and a resilient pad member held in close engagement against the concaved face of said holding frame by the marginally flanged portions thereof, said pad member being also similarly apertured and being adapted to be pressed tightly about a ball stud whose stem extends through the several registering holes, thereby sealing the interior of the drag link structure against the ingress of foreign matter.

3. Means for protecting that portion of a drag link structure within which a ball stud engages from the access of minute foreign particles, comprising a centrally-apertured semi-cylindrical shell provided with means for effecting its tight positioning about the drag link structure, a marginally flanged holding frame provided with a central aperture adapted to register with the aperture in said shell when the frame is positioned within the concaved portion thereof, and a correspondingly apertured pad member adapted to be held in position against said frame member by the marginal engagement therewith of the flanged edge portions of the latter, the knuckled end of a ball stud being adapted to be passed through said registering holes and into the interior of the drag link structure while the tight engagement of the pad structure about the stem of the ball stud is maintained by said holding shell and the pad-engaging frame.

WILLIAM R. WILEY.